United States Patent

Goellner

[15] 3,696,829
[45] Oct. 10, 1972

[54] AUTOMATIC STEAM TRAP

[72] Inventor: Allan R. Goellner, Parma Heights, Ohio

[73] Assignee: The Clark-Reliance Corp., Cleveland, Ohio

[22] Filed: Dec. 30, 1970

[21] Appl. No.: 102,645

[52] U.S. Cl. ................................................ 137/183
[51] Int. Cl. ................................................ F16t 1/00
[58] Field of Search ........... 137/183, 200; 251/44, 42

[56] References Cited

UNITED STATES PATENTS 3,200,834   8/1965   Pape ........................... 137/183
2,329,001   9/1943   Robinson ................. 251/44 X

*Primary Examiner*—Alan Cohan
*Attorney*—Bosworth, Sessions, Herrstrom & Cain

[57] ABSTRACT

An automatic steam trap that utilizes a floating disc located in a sealed control chamber to open and close inlet and outlet ports in the floor of the control chamber for steam and for air and/or condensate respectively. The disc moves in response to the pressure condition in the chamber between a closed position sealing off the ports and an open position spaced away from the ports. The movement of the disc to its open position is limited by a tubular spacer in the control chamber with spaced projections engageable with the outer margin of the top surface of the disc. The spaces between the projections permit fluid to pass from the lower portion of the control chamber below the disc to the upper portion of the control chamber above the disc so that fluid pressure can act against the top surface of the disc.

3 Claims, 3 Drawing Figures

PATENTED OCT 10 1972
3,696,829

INVENTOR.
ALLAN R. GOELLNER
BY Bosworth, Sessions,
Herrstrom & Cain
ATTORNEYS

AUTOMATIC STEAM TRAP

BACKGROUND OF THE INVENTION

This invention relates to steam traps for removing accumulations of condensed steam and air from steam systems, and especially to automatic steam traps using a "floating" disc as the valve means, such as in the steam traps disclosed in U. S. Pat. No. 3,150,677, issued Sept. 29, 1964 and owned by the assignee of the present application. More particularly the invention relates to an improved means for controlling the movement of the disc between its open and closed positions.

Floating disc type steam traps have a relatively flat circular disc located in a sealed control chamber within the body of the trap simultaneously to open and close an inlet port and an outlet port. The traps are designed to permit the passage of condensate and as much air as possible to the outlet, while permitting the passage of as little steam as possible. The force exerted against the disc by the fluid in the control chamber determines its position relative to the inlet and outlet ports. When condensate is passing through the trap the disc is pushed away from the seating surfaces adjacent the ports by the force of the fluid in the system bearing against the bottom surface of the disc. This condition permits the free flow of condensate through the trap. When substantially all of the condensate has passed through the trap, steam tends to accumulate in the control chamber on the top side of the disc until the pressure causes a resultant force sufficient to move the disc into contact with the seats adjacent the inlet and outlet ports and thereby shut off the flow of fluid through the trap.

U. S. Pat. No. 3,150,677 discloses an automatic steam trap of a particularly advantageous design. As shown and described therein the body of the trap is provided with an inlet passage and an outlet passage as well as a bore with a threaded counterbore. The bore receives a cylindrical seating element with ports therethrough that register with the inlet and outlet passages respectively formed in the body of the trap. Both of the ports in the seating element are located so as to be in the floor of the control chamber against which the disc seats.

The threaded counterbore receives a cap with a threaded cylindrical flange that defines with the top surface of the seating element a cylindrical control chamber within the flange. The disc is located within the control chamber and when the trap is closed, the disc is seated on the top of the seating element to close and seal both the inlet and outlet ports. When the disc is moved upwardly to its open position by the flow of condensate, it is spaced below the ceiling of the control chamber by means of a central boss extending downwardly from the top of the control chamber. The boss serves as a stop or spacer and when the disc is in its open position, fluid in the control chamber is able to pass around the edges of the disc to an annular space at the top of the control chamber so that the pressure of the fluid acts against an annular portion of the top surface of the disc.

The central boss engages the disc in its center rather than at its edges and for this reason the disc may under certain circumstances tip or cock one way or the other on an edge of the boss and may become stuck in the control chamber in an undesirable position. Also because the disc may tip one way or the other on the boss, the contacting surfaces of the disc and the boss may become worn so that in its raised position the disc will not be parallel to the floor of the control chamber. Furthermore, the boss is difficult to form in the cap, its face must be accurately machined and the entire cap hardened so that the boss will be hardened to reduce wear.

The automatic steam trap of the present invention reduces the difficulties indicated above and affords other features and advantages not obtainable from the prior art.

SUMMARY OF THE INVENTION

It is among the objects of the invention to more accurately control the movement and positioning of a floating disc within the control chamber of an automatic steam trap.

Another object is to provide an improved steam trap that may be assembled with improved efficiency and manufactured at relatively low cost.

Another object is the provision of a stop for the disc of a steam trap that can be hardened at reasonable cost to reduce wear.

These and other objects and advantages are accomplished by means of a separately formed tubular spacer located in the control chamber of an automatic steam trap of the type described and which utilizes a floating disc movable between a closed position resting against the seat adjacent the inlet and outlet ports and an open position spaced from the floor and the ceiling of chamber. The spacer is of generally tubular form and has an upper end adjacent the ceiling of the control chamber and a lower end with a plurality of projections circumferentially spaced around its perimeter. The projections of the spacer have lower end surfaces located in a plane parallel to the floor and engageable with the outer margin of the top surface of the disc at circumferentially spaced locations, the spaces between the projections providing passages communicating between the upper part of the control chamber above the disc and the lower part of the control chamber below the disc.

DESCRIPTION OF THE PREFERRED EMBODIMENT

Figures 1, 2, 3:
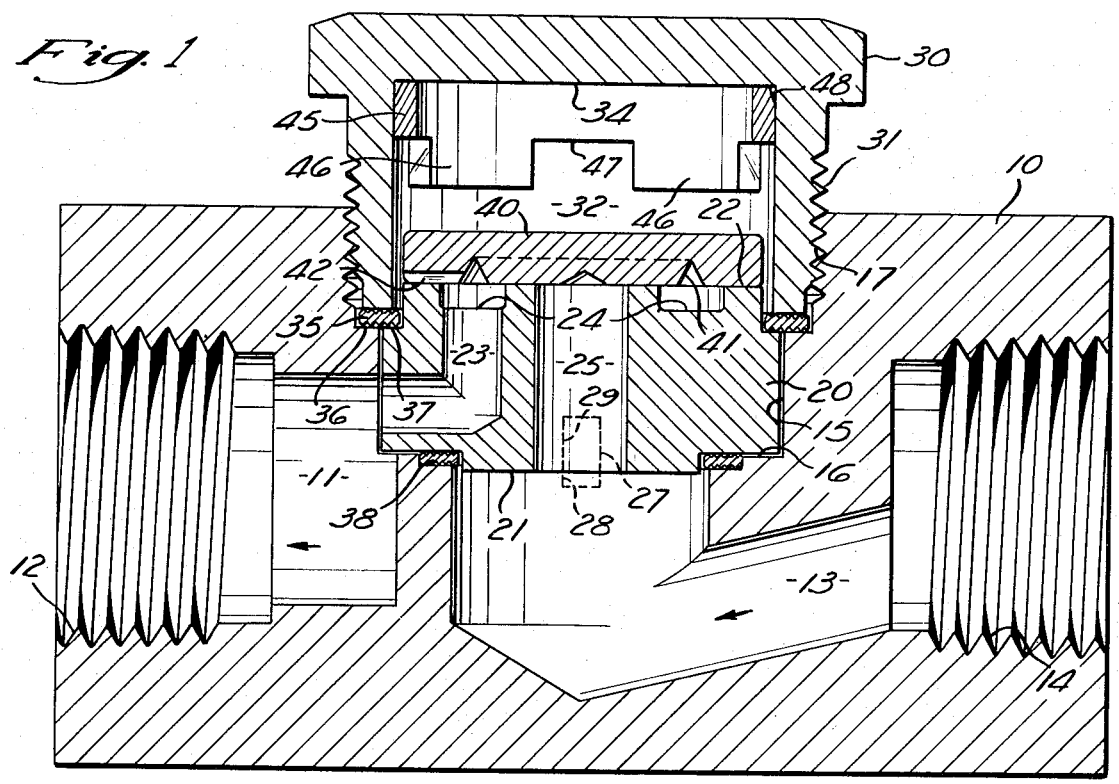
FIG. 1 is a vertical section through a floating disc type steam trap embodying the invention and showing the floating disc in its closed position.
FIG. 2 is a fragmentary sectional view similar to FIG. 1 but showing the disc in its open position.
FIG. 3 is a perspective view showing the annular spacer sleeve of the invention.

Referring more particularly to the drawings there is shown a floating disc type automatic steam trap including a trap body 10 with an outlet passage 11 communicating with a threaded receptacle 12 for an outlet fitting (not shown), and an inlet passage 13 communicating with a threaded receptacle 14 for an inlet fitting (not shown). Also formed in the body 10 between the passages 11 and 13 is a bore 15 with a shoulder 16 and a threaded counterbore 17. The outlet passage 11 leads from the side of the bore 15 while the inlet passage 13 leads into the center of the annular shoulder 16.

A cylindrical seating element 20 is received within the bore 15 with its bottom surface 21 adjacent the shoulder 16 and its top surface 22 located within the counterbore 17. The seating element 20 has an outlet port 23 formed therein that communicates with the outlet passage 11 in the body 10 at one end and terminates at the other end in an annular groove 24 formed in the top surface 22. The seating element also has an axial inlet port 25 that communicates with the inlet passage 13 in the trap body 10 and terminates in the center of the top surface 22. The seating element is secured in position in the bore 15 with its outlet port 23 in proper registration with the outlet passage 11 by means of a positioning pin 27 that has its lower end received in a small recess 28 formed in the shoulder 16 of the bore 15 and its upper end received in a recess 29 formed in the bottom of the seating element 20.

A cap 30 having a hollow threaded cylindrical flange 31 is received in the threaded counterbore 17 and, with the top surface 22 of the seating element 20, defines a control chamber 32 of generally cylindrical form. The top surface 22 of the seating element 20 serves as the floor of the control chamber 32 and the inside underneath surface of the cap 30 constitutes the ceiling 34 for the control chamber 32.

An annular metal gasket 35 formed, for example, of stainless steel is positioned above the shoulder 36 formed between and against an adjacent annular shoulder 37 formed in the seating element 20. The gasket 35 is forced against the respective surfaces of the shoulders to provide a tight seal by the annular bottom edge of the threaded flange 31 of the cap 30. Another gasket 38 is located between the shoulder 16 of the bore 15 and the bottom surface 21 of the seating element 20.

Located within the control chamber 32 is a circular floating disc 40 with its diameter somewhat less than the diameter of the control chamber 32. There is sufficient clearance between the edges of the disc 40 and the side walls of the control chamber 32 to permit free passage of fluid around the disc 40.

The bottom surface of the disc 40 has an annular groove 41 that register with the annular groove 24 formed in the top of the seating element 20 and communicating with the outlet port 23. A leakage duct 42 extends between the annular groove 41 and the control chamber 32 for a purpose described in detail in U. S. Pat. No. 3,150,677.

FIG. 1 shows the floating disc 40 in its closed position wherein it seats against the floor of the control chamber 32 and seals the ports 23 and 25. The movement of the disc 40 to its open position illustrated in FIG. 2 is limited to a desired location intermediate the floor constituted by the surface 22 and ceiling 34 of the control chamber by means of an annular cylindrical spacer sleeve 45 preferably formed of hardened high carbon steel or stainless steel. Referring to FIG. 3 which shows the sleeve in perspective, it will be seen that the sleeve has a continuous annular top edge which bears against the ceiling 34 of the control chamber. The lower portion of the spacer sleeve is provided with four projections 46 symmetrically spaced about the circumference of the sleeve 45 and having spaces 47 therebetween. The projections have downwardly facing bottom edge surfaces that lie in a plane parallel to the floor of the control chamber 32 i.e., the top surface 22 of the sealing member. These are adapted to engage marginal portions of the floating disc 40 at spaced locations around the circumference thereof and thus provide a stop or limit for the disc 40 that determines its open position. The engagement of the projections 46 adjacent the circumference of disc prevents tilting of the disc and improves the durability and reliability of the trap in service.

The spaces 47 provide passages through which fluid can flow freely the lower part of the control chamber 32 below the disc 40 and the upper part of the control chamber above the disc 40 when the disc is in the open position indicated in FIG. 2. In this way fluid pressure above the disc 40 can act over a relatively large portion of the top surface thereof so that when the resultant force due to the pressure above the disc reaches a certain level it is effective to force the disc to its closed position indicated in FIG. 1. With this arrangement the machining of a boss or other structure within the hollow shaft 31 to provide a stop is eliminated and the possibility of tilting of the floating disc 40 when in its open position is substantially reduced. Since the spacer sleeve 45 is formed as a separate element, it can be hardened independently of the cap and at reasonable cost to provide a long-wearing stop.

The assembly of the cap 30 and the spacer sleeve 45 is easily accomplished merely by inserting the sleeve 45 into the hollow flange 31 before the cap 30 is threaded into the counterbore 17. The diameter of the sleeve 45 is just slightly greater than that of the interior surface of the flange 31 so that it is necessary to force the sleeve 45 firmly into its assembled position. To facilitate assembly a bevel 48 is provided adjacent the upper end of the sleeve 45.

The operation of the trap is like the trap of U. S. Pat. No. 3,150,677. The trap of the present invention is advantageous, however, because of economies in manufacture, improved durability and greater stability of the disc.

As in the trap of U. S. Pat. No. 3,150,677, the floating disc 35 is moved by the action of air or condensate passing through the trap from a position in which the disc 40 seats against the top surface of the seating element 20 as shown in FIG. 2 to a position at which it is spaced from the floor of the chamber with marginal portions around its circumference in engagement with the bottom surfaces of the projections 46 in the sleeve 45. In this position fluid in the chamber can pass freely between the space above the disc and the space below the disc through the spaces 47. Also the disc 35 is seated in a very stable condition and will not be able to tilt or cock due to the symmetrical perimetric zones of support provided by the projections 46. After most of the condensate has passed through the trap the last portion thereof is at a temperature closely approaching the steam temperature of the system. Since the condensate is at such a high temperature there is a tendency for a portion to flash into steam and this together with the kinetic energy of the fluid increases the fluid pressure acting against the top surface of the disc 40 until the total force acting against the top surface of the disc 40 becomes greater than the force acting on the bottom surface thereof and thereby the disc is forced into contact with the surface 22 constituting the floor of the control chamber 32 to close the ports 23 and 25. The disc 40 remains in contact with the floor of the chamber until the fluid pressure in the chamber 32 is reduced to the point that the force acting against the top surface of the disc 40 is less than the effective force exerted against the bottom thereof. This reduction in pressure is largely the result of the heat energy transferred to the surrounding atmosphere and the fluid which escapes through the leakage duct 42 connecting the annular groove 24 with the control chamber 32. The leakage duct 42 is desirable to insure the opening and closing of the trap at sufficiently frequent intervals to assure adequate passage of air or other non-condensible gasses through the trap. The function and advantages obtained by the leakage duct 42 are presented in more detail in U. S. Pat. No. 3,150,677 and form no part of the present invention.

While the invention has been illustrated and described with respect to a specific embodiment thereof, this is intended for the purpose of illustration rather than limitation and other forms and modifications will be apparent to those skilled in the art upon a reading of the specification and appended claims. Wherefore the patent is not to be limited in any way that is inconsistent with the extent to which the progress in the art has been advanced by the invention.

I claim:

1. In an automatic steam trap having a control chamber with a floor and ceiling and a cylindrical side wall, an inlet port in said floor, an outlet port in said floor and a floating disc located in said chamber having a diameter slightly less than the diameter of said chamber and movable between a closed position seated against said floor and closing said ports and an open position spaced from said floor and from said ceiling and in which said ports are open, the improvement which comprises a separately formed annular cylindrical spacer sleeve composed of hardened steel disposed in said control chamber for stopping said disc when in its open position at a location spaced from said ceiling and above said floor, said spacer sleeve projecting downwardly toward said floor and being retained in position in said chamber by frictional engagement between the outer surface thereof and the side wall of said chamber and having an upper end seated against a portion of said chamber and a lower end with a plurality of circumferentially spaced projections adjacent the side walls of said control chamber extending toward said floor, said projections having lower end surfaces lying in a plane spaced from and parallel to said floor and being engageable throughout substantially their entire areas with marginal portions of the top surface of said disc adjacent the circumference thereof, the location of the lower end surfaces of said spacer sleeve with respect to said disc being fixed by said engagement of the upper end of said sleeve with said chamber, the spaces between said projections providing passages communicating between the upper part of said control chamber above said disc and the lower part of said control chamber below said disc.

2. Apparatus as defined in claim 1 wherein said projections are uniformly spaced about the perimeter of said spacer.

3. Apparatus as defined in claim 2 wherein said spacer has four of said projections symmetrically spaced about the axis of said spacer, each extending about 45° of arc around the circumference of said spacer.

* * * * *